Dec. 12, 1944. B. V. ELLIOTT 2,364,963
PIPE BEVELLING MACHINE
Filed April 20, 1943 2 Sheets-Sheet 1
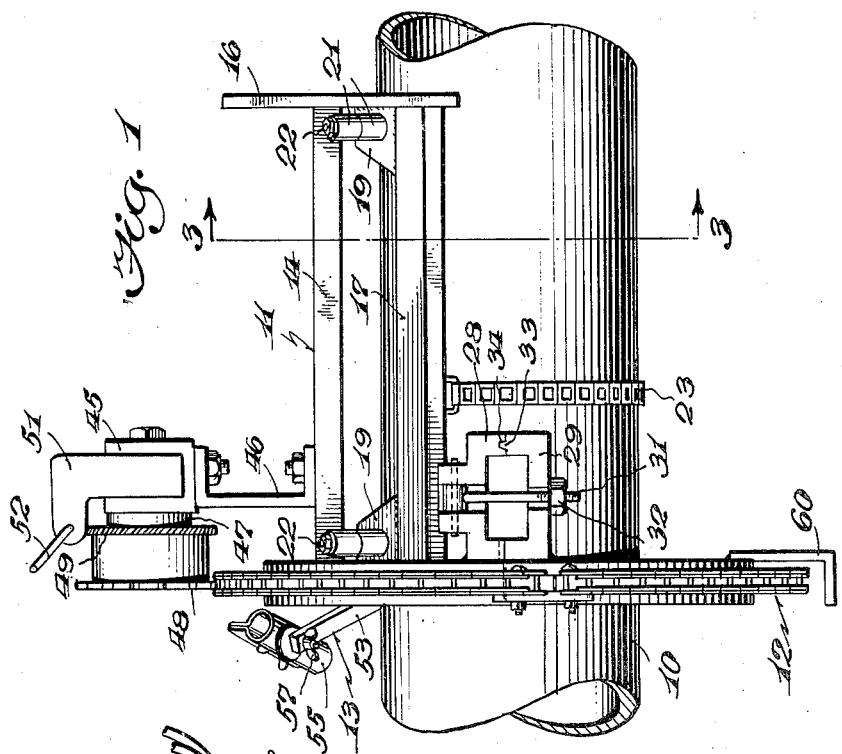
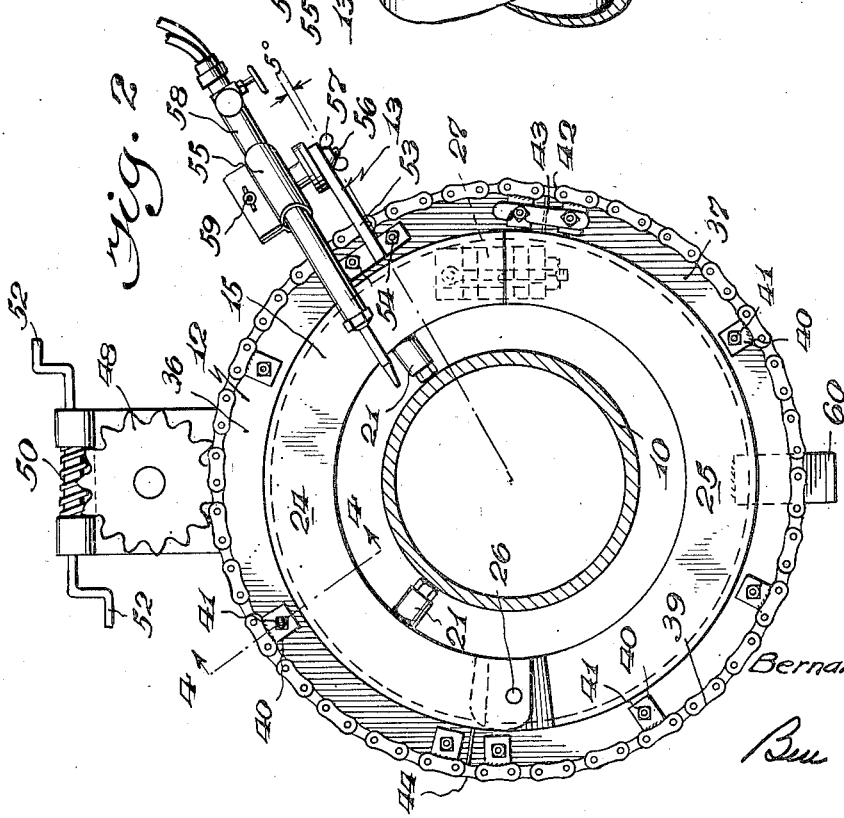
Inventor
Bernard V. Elliott,
Attorney Dec. 12, 1944. B. V. ELLIOTT 2,364,963
PIPE BEVELLING MACHINE
Filed April 20, 1943 2 Sheets-Sheet 2

Inventor
Bernard V. Elliott,
By Ben Cohen
Attorney

Patented Dec. 12, 1944

2,364,963

UNITED STATES PATENT OFFICE 2,364,963

PIPE BEVELING MACHINE

Bernard V. Elliott, Bartlesville, Okla., assignor to H. C. Price Company, Bartlesville, Okla.

Application April 20, 1943, Serial No. 483,811

3 Claims. (Cl. 308—15)

The present invention relates to a pipe beveling machine for cutting and preparing pipe for welding by means of a cutting torch.

It is an object of the present invention to provide a portable machine for use in cutting pipe in the field, and particularly to pipes of large diameters used in constructing pipe lines. The machine is constructed and operates in such manner that it cuts and bevels the pipe to any desired angle and the cut obtained is square with reference to the axis of the pipe.

A further object of the invention is the provision of a novel supporting means for rigidly supporting the pipe to be cut and which is readily adapted for mounting on pipes of different diameters.

A still further object of the invention is the provision of a novel supporting means for the cutting torch whereby the cutting torch may be adjusted relative to the work to vary the degree of bevel on either side of the perpendicular.

Other objects of the invention will become apparent to those skilled in the art from the following detailed description taken in connection with the accompanying drawings which disclose a preferred embodiment of the invention.

Figure 1 is a side elevation of the device mounted on a pipe,

Figure 2 is a front elevation thereof,

Figure 3:
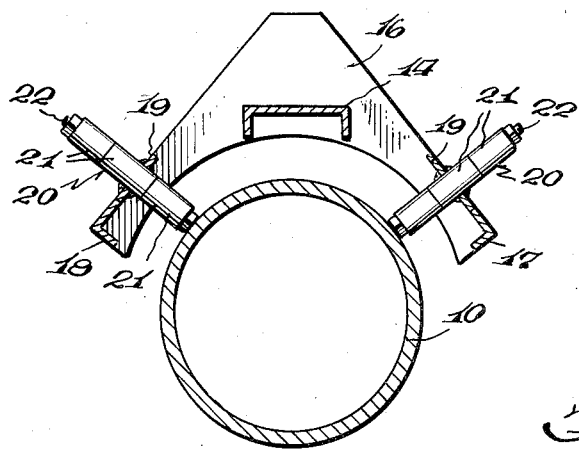
Figure 3 is a section taken on the line 3—3 of Figure 1.

Referring to the drawings in detail, the numeral 10 designates a pipe section which it is desired to cut and bevel, 11 indicates generally the supporting frame or saddle, 12 indicates the operating mechanism and 13 represents the torch carrying mechanism. The frame or saddle 11 comprises a channel shaped angle iron 14 having its ends welded to a ring member 15 and an end plate 16. Additional bracing members in the form of angle irons 17 and 18 are respectively welded to members 15 and 16 on each side of member 14. A series of corner plates 19 are welded to the angle irons and to members 15 and 16 to provide additional bracing means for the frame and also serve as a support for leg members 20 adapted to bear against the upper surface of pipe 10.

Each leg member 20 is made up of a plurality of spacers 21 secured together by means of a bolt 22. Referring to Figure 3, three spacer members are used, the middle member being welded to plate 19 and the outer spacers being removable by means of the removable bolt member 22. The number of spacers to be employed may be varied depending upon the diameter of the pipe to be cut thus adapting the present machine to pipes of different diameters without changing any of the other parts of the machine. The pipe 10 is supported in position against the leg members by means of a chain 23 extending around the pipe and fastened to angle irons 17 and 18.

Figure 4:
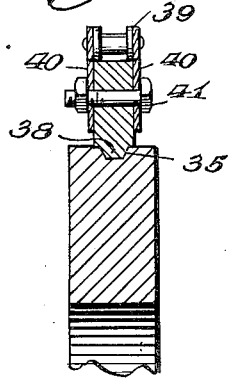
Figure 4 is a section taken on the line 4—4 of Figure 2.
Figure 5:
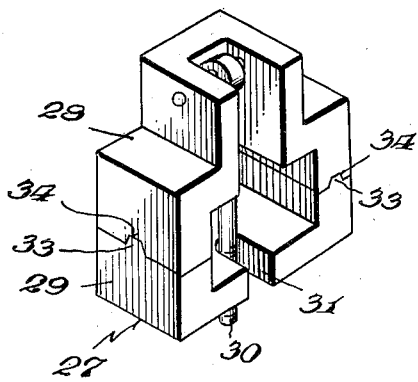
Figure 5 is an enlarged perspective view of the alignment device.
Figure 6:
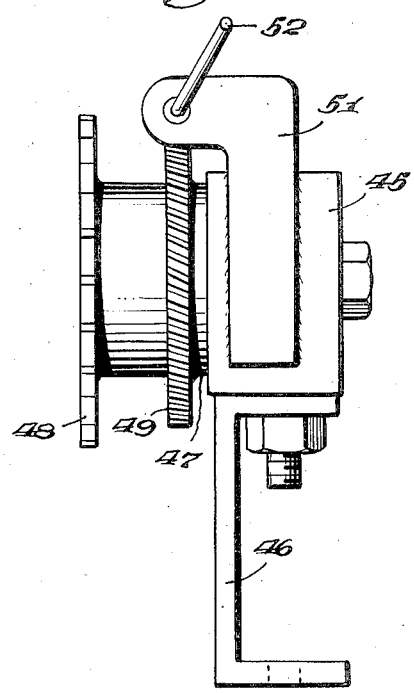
Figure 6 is an enlarged side view of the crank supporting mechanism.

As seen in Figure 2, a two-part ring-like vertical supporting member 15 depends from the frame or saddle 11 to surround the pipe to be cut and comprises a stationary main supporting ring cut along a diameter to form an upper section 24 and a lower section 25. The two sections are pivoted to each other in any suitable manner as at 26 and secured in closed position by means of cooperating bracing members extending laterally from the free ends of each ring section in the form of an alignment device designated generally by the numeral 27. As shown the alignment device comprises cooperating block-like members 28 and 29 each of which is respectively secured to upper and lower ring sections 24, 25 by means of welding. A swinging bolt 30 is pivotally mounted in the upper block member 28 and has a portion receivable in the slot portion 31 of the lower block member 29. A tightening nut 32 locks the two block members together. As seen in Figures 4, 5 block member 29 is provided with laterally spaced, right angularly disposed interlocking ridges 33 which cooperate with cooperating V-shaped grooves formed in member 28 in order to properly align and laterally brace the ring sections about the pipe. The outer periphery of the stationary ring member is provided with a groove 35 for a purpose to be described.

An outer rotating ring member also formed in sections 36 and 37, is provided with a tongue 38 on its inner periphery which tongue is receivable in groove 35 whereby the outer ring member is freely rotatable with the stationary ring member and locked thereto. The outer periphery of the rotating ring has a sprocket chain 39 removably secured thereto. The securing means comprises a plurality of plates 40 welded to the chain 39 at intervals of about five links and are bolted to the outer ring member by means of bolts 41. As seen in Figure 2, the break in the chain occurs at one of the splits between the ring sections forming the outer ring indicated by numeral 42. A latch member 43 locks the sections together about the stationary ring and link portion 44 opposite 42 serves as a hinge about which the ring sections may open.

The operating mechanism for rotating the outer ring comprises a housing 45 bolted to the frame through a bracket member 46. The housing 45 carries a rotatable shaft 47 on which is mounted a sprocket gear 48 and a mesh gear 49. A worm gear 50 is carried by arms 51 welded to the housing 45. Crank members 52 are provided for operating the worm gear.

Referring to Figures 1 and 2, the torch carrying member comprises a bracket arm 53 suitably bolted to the movable ring by means of bolts 54. The torch carrying sleeve 55 is mounted on the upper end of arm 53 by a threaded bolt 56 extending through the arm and held in fixed position by means of a thumb nut 57. From this construction it is clear that the sleeve is rotatable and may be adjusted in any desired position relative to the bracket arm. An acetylene torch 58, of well known construction, extends through the sleeve 55, the torch being vertically adjustable in the sleeve and held in adjusted position by means of a thumb screw 59. As seen in Figure 2, the bracket arm 53 is adjusted to an angle of five degrees to a line perpendicular to the axis of the pipe. The purpose of this angle is to preheat the pipe ahead of the cutting flame.

An L-shaped brace 60 is welded to the lower portion of the stationary ring in order to protect the chain from dirt and foreign matter when the machine is set on the ground and not in use.

In operating the present device, the saddle or frame will be positioned at the desired point on the pipe so as to bring the torch nozzle upon the line along which the pipe is to be cut. It will be understood that the lower sections of the rings will be unhinged as the device is being applied to the pipe and upon closing of the hinged sections, the alignment device 27 forming the latch or securing means for the stationary ring will serve to accurately line up the machine about the pipe so as to produce a true, square pipe end. The frame will then be clamped to the pipe by means of chain 23. The torch carrying sleeve will then be adjusted for setting the proper degree of bevel and it is clear from the construction herein shown that the bevel may be outwardly or inwardly directed by adjusting the sleeve on either side of the perpendicular. The outer ring with the torch thereon is thereupon rotated slowly in a clockwise direction by the gear and sprocket assembly until the pipe is completely severed.

Thus it will be seen that the construction herein shown and described is well adapted to accomplish the objects of the invention. It will be understood, however, that the invention may be embodied otherwise than here shown and that in the form illustrated, certain minor changes may be made without departing from the spirit of the invention. Therefore, I do not wish to be limited precisely to the construction herein shown except as may be required by the appended claims considered with reference to the prior art.

Having thus described the invention, what is claimed is:

1. In a pipe beveling machine including a two-part ring-like supporting member, rigid bracing members extending laterally from the free ends of said member parts and having interlocking opposed face portions, and detachable securing means carried by said bracing members for clamping said face portions in engagement whereby to rigidly secure said ring parts in alignment.

2. The structure defined in claim 1 wherein the interlocking opposed face portions are in the form of right angularly disposed interfitting tongue and groove portions.

3. The structure defined in claim 1 wherein the interlocking opposed face portions are laterally spaced and right angularly disposed, and the securing means for said bracing members is a swinging bolt mounted between the spaced interlocking portions of said members.

BERNARD V. ELLIOTT.